(No Model.) 4 Sheets—Sheet 1.

R. TELL.
TOBACCO TYING MACHINE.

No. 521,189. Patented June 12, 1894.

Witnesses
Geo. W. Young
Henry Dankert

Inventor
Richard Tell
By H. G. Underwood
Attorneys

THE NATIONAL LITHOGRAPHING COMPANY,
WASHINGTON, D. C.

(No Model.) 4 Sheets—Sheet 2.

R. TELL.
TOBACCO TYING MACHINE.

No. 521,189. Patented June 12, 1894.

Witnesses
Geo. W. Young
Henry Dankert

Inventor
Richard Tell
By H. G. Underwood
Attorney (No Model.) 4 Sheets—Sheet 3.
R. TELL.
TOBACCO TYING MACHINE.
No. 521,189. Patented June 12, 1894.
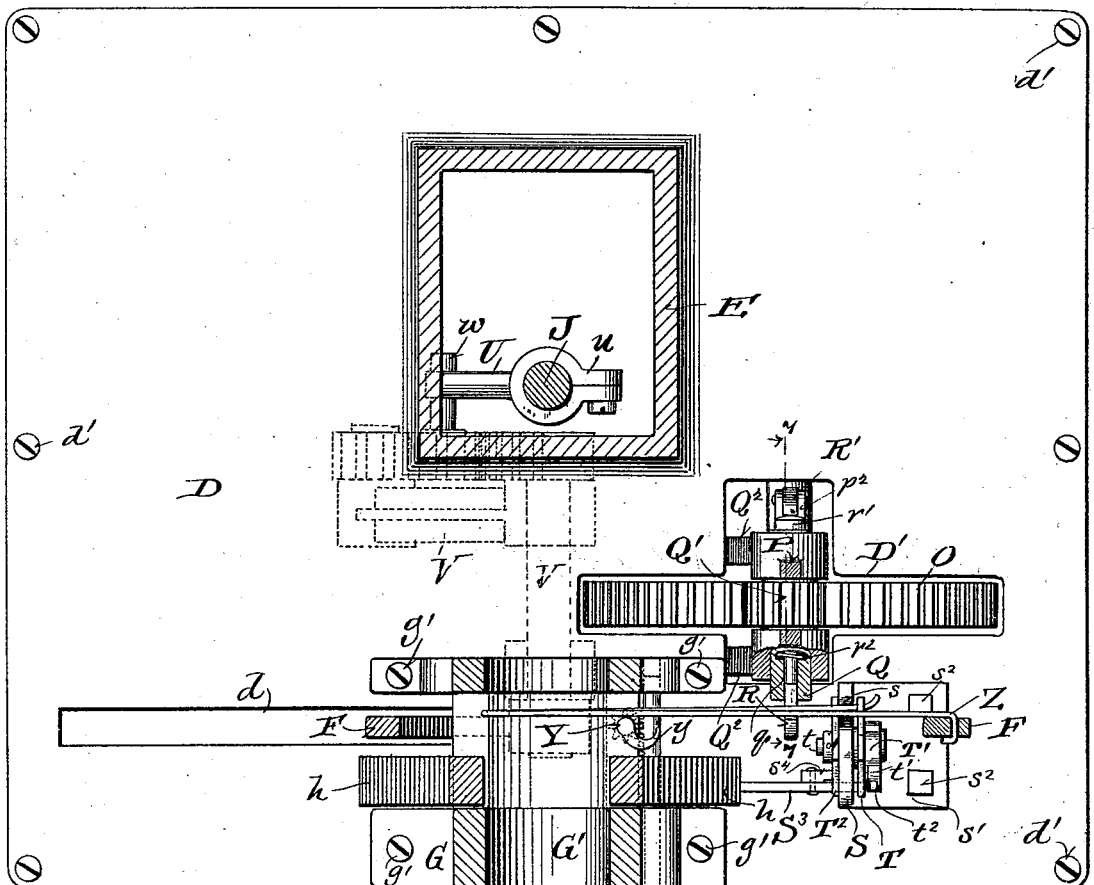
Fig. 3.
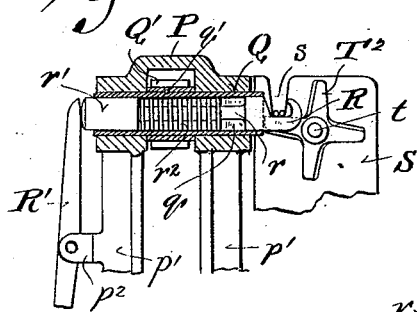
Fig. 7.
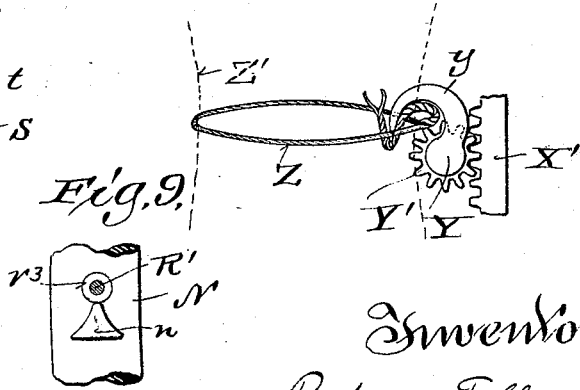
Fig. 8.
Fig. 9.
Witnesses
Geo. W. Young.
Henry Dankert
Inventor
Richard Tell
By H.G. Underwood
Attorney (No Model.) 4 Sheets—Sheet 4.
R. TELL.
TOBACCO TYING MACHINE.
No. 521,189. Patented June 12, 1894.
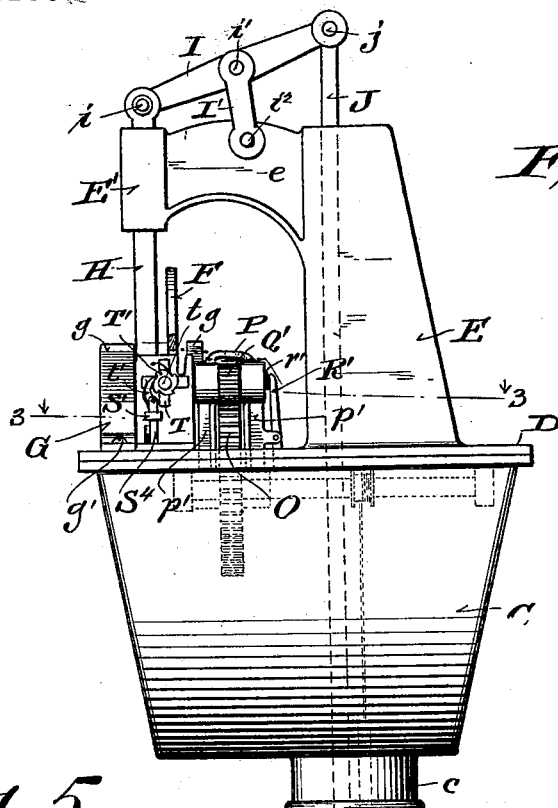
Fig. 4.
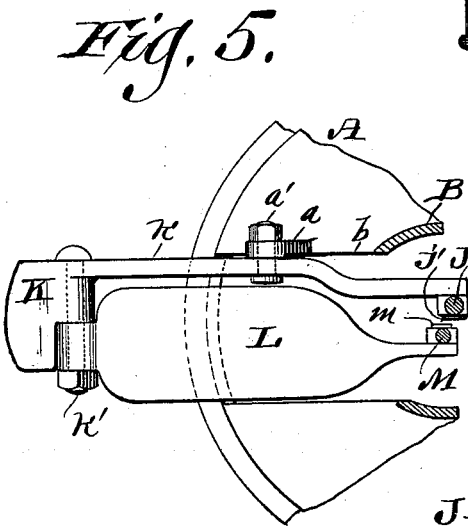
Fig. 5.
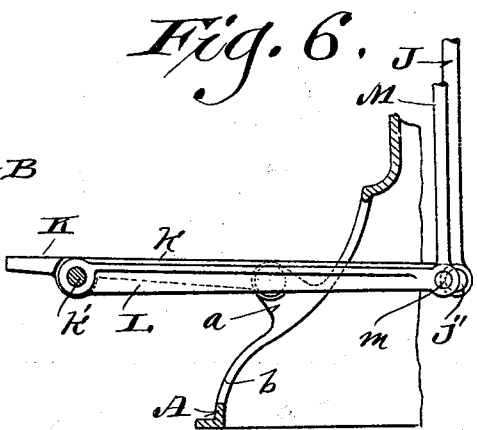
Fig. 6.
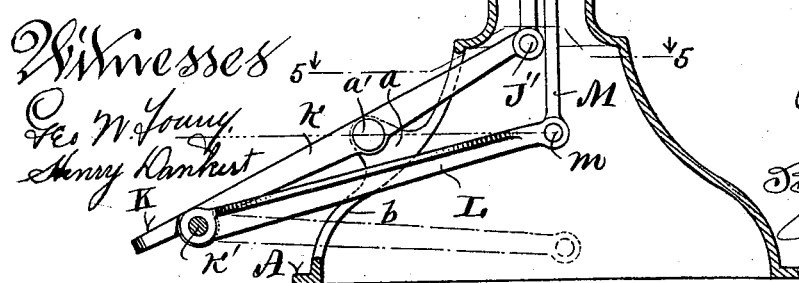
Witnesses
Geo. W. Young
Henry Dankert
Inventor
Richard Tell
By H. G. Underwood
Attorneys

UNITED STATES PATENT OFFICE.

RICHARD TELL, OF MILWAUKEE, WISCONSIN.

TOBACCO-TYING MACHINE.

SPECIFICATION forming part of Letters Patent No. 521,189, dated June 12, 1894.

Application filed February 8, 1894. Serial No. 499,466. (No model.)

*To all whom it may concern:*

Figure 1:
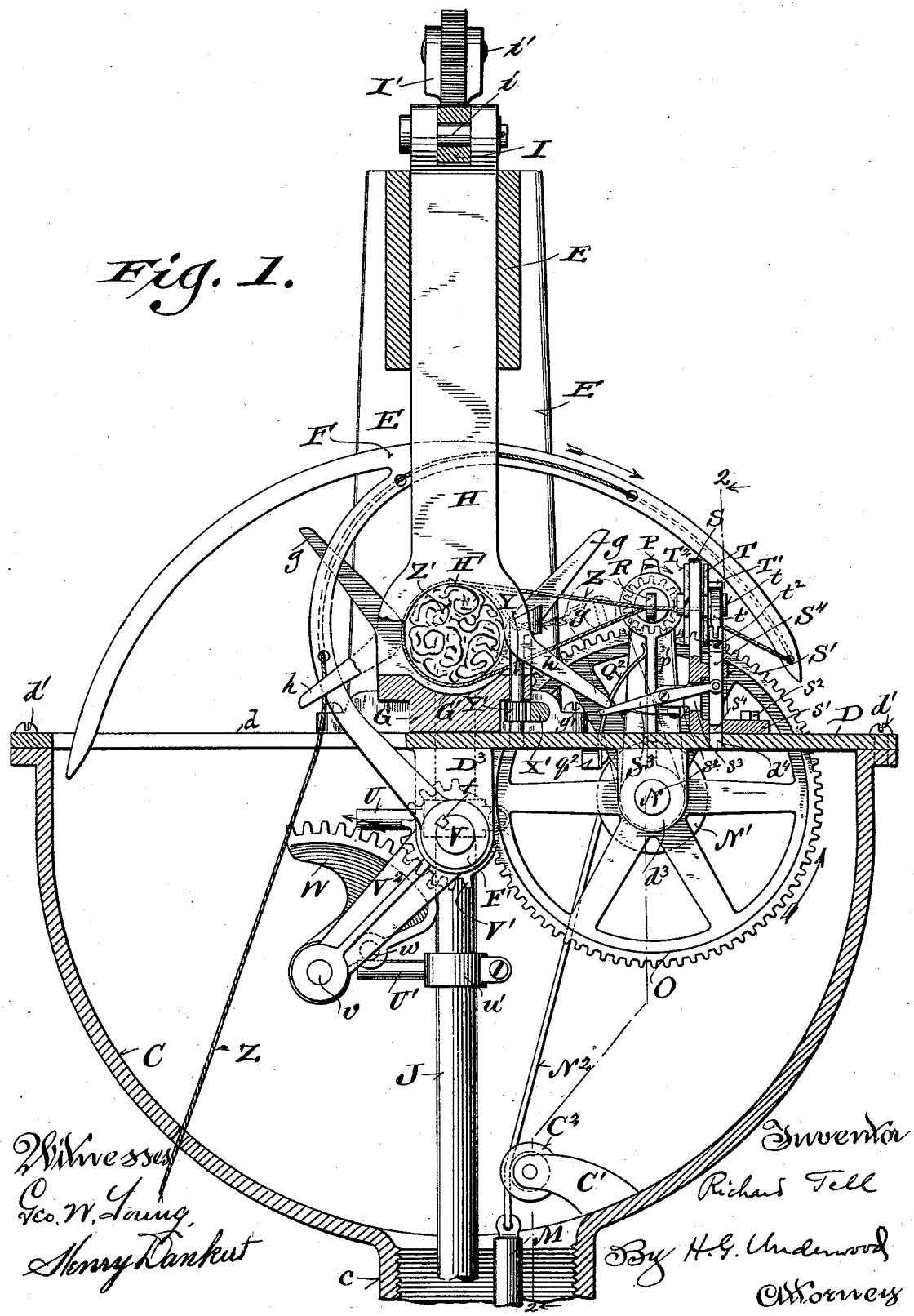
Figure 2:
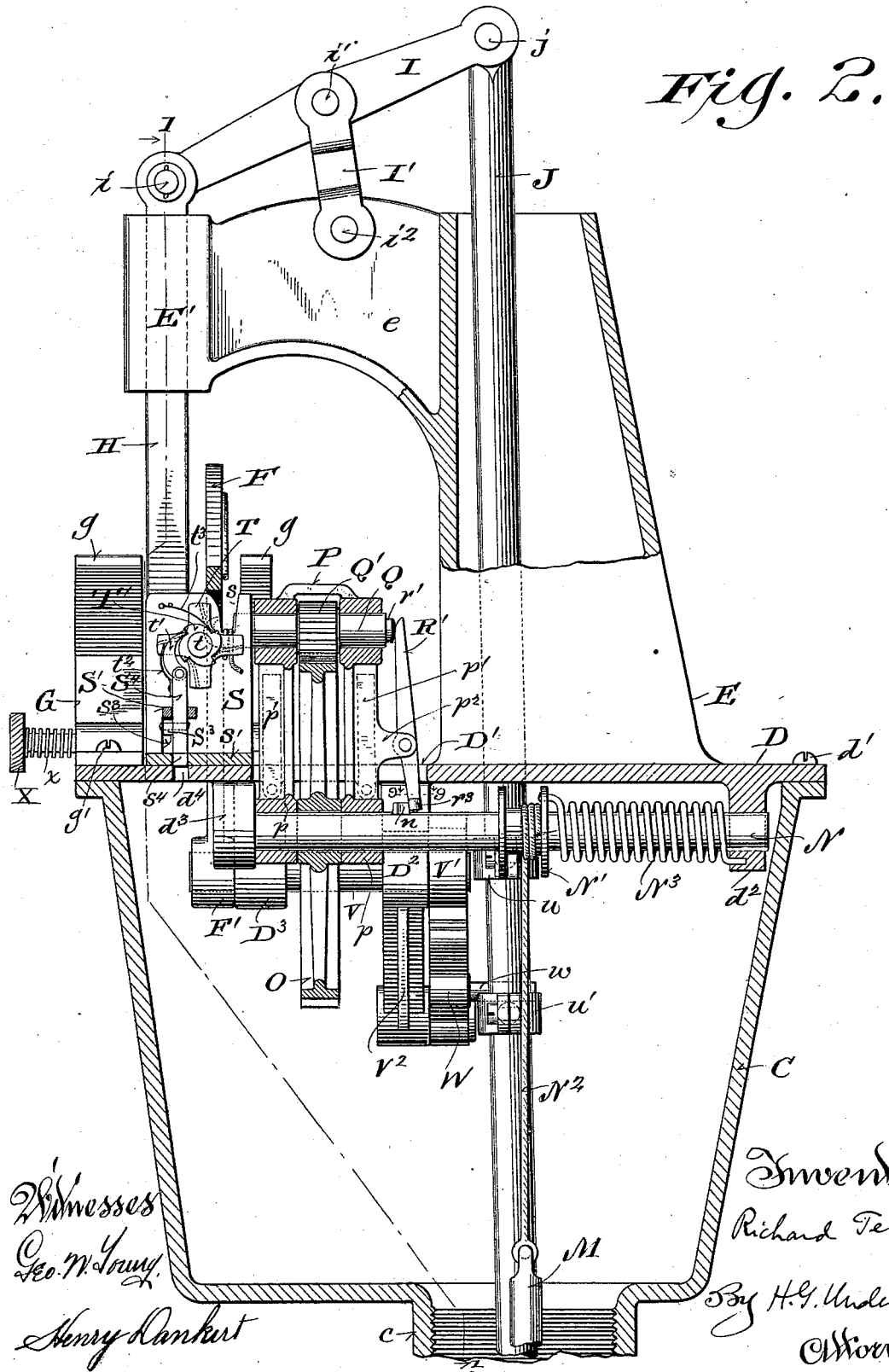

Be it known that I, RICHARD TELL, a citizen of the United States, and a resident of Milwaukee, in the county of Milwaukee, and in the State of Wisconsin, have invented certain new and useful Improvements in Tobacco-Tying Machines; and I do hereby declare that the following is a full, clear, and exact description thereof.
My invention relates especially to machines for tying tobacco in hands, and consists in certain peculiarities of construction and combination of parts as will be fully set forth hereinafter and subsequently claimed.
In the drawings: Figure 1 is a vertical section of the upper part of my machine on the line 1—1 of Fig. 2. Fig. 2 is a similar section, with the device at a right angle to the position shown in Fig. 1, taken on the line 2—2 of said Fig. 1. Fig. 3 is a horizontal section on the line 3—3 of Fig. 4. Fig. 4 is a side elevation of my machine with the lower part partially broken away to better illustrate details of construction. Fig. 5 is a detail sectional view on the line 5—5 of Fig. 4. Fig. 6 is a detail view of the parts shown in the lower portion of Fig. 4, but in a different position. Fig. 7 is a detail sectional view on the line 7—7 of Fig. 3. Fig. 8 is an enlarged detail view of a portion of the tying mechanism. Fig. 9 is a detail sectional view on the line 9—9 of Fig. 2.

A represents the hollow base of my machine, and B the hollow standard.
C is a semi-circular cup or shell, having a hollow shank $c$ with interior screw-threads to fit upon the upper end of the standard B. A plate or platform D rests on the upper edge of this cup or shell C, and is secured thereto, as by bolts or screws $d'$ $d'$.

E represents a hollow post rising from the platform D, open at the top and provided with an arm $e$ at its upper end, terminating in a hollow guide E'. The said platform is further provided with a slot $d$ for the passage therethrough of the needle F, as hereinafter described.

G is a casting, secured as by screws or bolts $g'$ $g'$ to the platform D adjacent to the slot $d$, and having four upward projecting arms $g$ $g$ arranged in pairs to form forks, as shown, one fork on each side of said slot, said casting being formed with a rounded concave upper surface, as shown at G', between its arms, forming a receiver for the goods to be tied.

H is a compressor provided with two downwardly diverging arms $h$ $h$, forming a fork, adapted to come down between the forks $g$ $g$, just described, and between the outer fork of the casting and the slot $d$, and the under surface of the compressor is formed with a rounded concave H' corresponding to that G' just below it. The shank of this compressor moves in the described guide E' and its upper end is pivoted, as by pin $i$, to one end of a lever I fulcrumed centrally as shown at $i'$ to a link I' which in turn is pivoted as shown at $i^2$ to the described arm $e$, while the other end of said lever I is pivoted, as shown at $j$ to a rod J which extends down through the hollow post E, cup or shell C, and hollow standard B, to the base thereof. This hollow base A is provided with a slot or opening $b$ in one side, and at one edge of said slot with a lug or bearing $a$, and through this slot or opening there projects the double treadle illustrated in Figs. 4, 5 and 6.

K is the heel treadle, having a shank $k$ pivoted at $a'$ to the lug $a$ and at its inner end, as shown at $j'$ to the lower end of the rod J.

L is the foot or toe treadle pivoted at its outer end, as shown at $k'$ to the heel treadle K, and at its inner end as shown at $m$, to the lower end of a suspended rod M, hereinafter described.

From the under side of the platform D there depend two lugs $d^2$ $d^3$ which form the bearings of a shaft N, which is provided with a reel or spool N', fast thereon, for a cord $N^2$ the lower end of which cord is secured to the upper end of the described suspended rod M. As a matter of fact, if desired, this rod M could be dispensed with and the lower end of the cord $N^2$ be attached directly to the inner end of the treadle L, but the construction shown is the preferred one.

$N^3$ is a spring upon the shaft N, one end of said spring being secured to the reel or spool N' and the other end to the lug $d^2$.

C' is an arm on the inside of the cup or shell C carrying a roller $C^2$ for guiding the cord $N^2$. Near the opposite end of the shaft N is a gear-wheel O, fast thereon, which passes up through a cross-shaped slot D' in the platform D, and loosely mounted on said shaft are the hubs $p\ p$ of a yoke P the branches $p'\ p'$ of which yoke rise from said hubs and extend up through the described slot D'. The upper part of the yoke P is bored transversely to receive a sleeve Q, one end of which is solid or closed, except for a vertical slot $q$ communicating with the bore of said sleeve, and Q' is a pinion, made fast to said sleeve, as shown at $q'$ and which meshes with the described gear wheel O. Beneath the platform D are lugs $q^2$ to which are secured the springs $Q^2$ extending up through the slot D' and bearing against the branches $p'\ p'$ of the yoke P. Within the sleeve Q is the shank $r$ of a hook R, the front end of said shank and the said hook being squared or formed with flat vertical sides to pass through the described slot $q$ in the closed end of the said sleeve, and the rear end of said shank $r$ is screwed into a plug $r'$, a spiral spring $r^2$ surrounding said shank within the sleeve. On one of the yoke branches $p'$ is an arm or bearing $p^2$ to which is pivoted a lever R' the upper end of which bears against the plug $r'$ and the lower end of the lever is rounded or provided with a roller $r^3$ for engagement with a cam $n$ on the shaft N as hereinafter described.

S is a vertical plate, provided with a cord receiving notch $s$, and having a horizontal base flange $s'$ by which it is secured to the platform D, as shown at $s^2\ s^2$. The said plate S is provided with a slotted guide arm S' on one side and with a slot $s^3$ immediately under the same, and an arm $S^2$ projecting from its opposite side in line with the wall of said slot. The base flange $s'$ is provided with a slot $s^4$ in line with the slot in the guide arm S' and the platform D with a slot $d^4$ just beneath the slot $s^4$.

$S^3$ is a lever pivoted to the arm $S^2$ and $S^4$ a vertically moving arm pivoted to one end of said lever $S^3$ the other end of which extends under the path of travel of the adjacent compressor arm $h$.

T is a four-armed cord-holder, mounted rigidly on a shaft $t$ extending through the plate S, and T' is a four-toothed ratchet also rigidly secured to shaft $t$, on the same side of the plate S, while $T^2$ is a four-bladed knife or cord-cutter, on the other side of the plate S, but also rigidly secured to the shaft $t$. A dog $t'$ for engagement with the ratchet T' is pivotally secured to the upper end of the arm $S^4$ and held in place by a spring $t^2$ on said arm, there being also a spring $t^3$ on the plate S for engagement with the ratchet T'.

The rod J is provided with two pins U U' secured thereto, as by clips $u\ u'$, and from the under side of the platform D there depend two hangers or bearings $D^2\ D^3$ for a shaft V. The hub F' of the needle F is keyed to this shaft, as shown at $f$, and to the other end of this shaft is keyed a mutilated pinion V'. From the hanger $D^3$ there projects a bracket arm $V^2$ provided with a stud $v$ on which is loosely mounted a toothed segment W for engagement with the teeth of the pinion V', and carrying a pin $w$ projecting on a line transverse to the line of projection of the pins U U' on the rod J, and adapted for engagement therewith, at stated times, as hereinafter explained.

The casting G is bored out, horizontally, to receive a push-rod X, terminating in a rack-bar X' at its inner end, there being a spring $x$ interposed between the handle or button of this push-rod and the frame of the machine. The said casting is further bored out, vertically, to receive a rod Y, provided near its lower end with a pinion Y' and with a spiral hook $y$ at its upper end, for tucking in the ends of the cord of the tied bundle, as hereinafter described.

The operation of my device is as follows: The double treadle K L is brought by the foot of the operator into the position shown in Fig. 6, which will raise the compressor H (shown in all the views in a closed position) to an open position when a bundle of tobacco leaves, called technically a "hand," is to be tied. This operation of the treadles will draw down on the rod J, and the pin U will press down on the pin $w$, and thereby operate the segment W and the mutilated pinion V', partly revolving the shaft V, thereby reversing the position of the needle F from that shown in Fig. 1, and carrying the binding twine or wire Z across the rounded concave G' of the said casting, the other end of the said twine or wire being held between the cord-holder T and plate S. The "hand" of tobacco Z', is then placed in position over the said concave G', between the arms $g\ g$, and the double treadle is reversed, back to the position shown in full lines in Fig. 4, which brings the compressor H down upon the "hand," and carries the needle F and twine or wire Z, to the positions best shown in Fig. 1, this operation of the needle being effected by means of the described pins U' and $w$, segment W and pinion V' on the needle shaft V, in an obvious manner. The treadles K L are operated in a heel and toe manner, the heel of the operator pressing down on the treadle K, which serves to bring the arm $h$ down on the adjacent end of the lever $S^3$ raising the other end of said lever and with it the arm $S^4$ and dog $t'$, moving the ratchet T', shaft $t$, cord-holder T, and knife $T^2$. Simultaneous with this movement of the heel, the toe or foot of the operator presses the treadle L down to the position shown in dotted lines in Fig. 4, which draws down (through rod M if that be employed) on the cord $N^2$ and revolves the shaft N. The heel motion just described, has served to cut the twine or wire Z, and instantly as the shaft N revolves, the gear-wheel O, fast on said shaft, is carried around with it, the cam $n$ on said shaft is freed from contact with the roller or rounded lower end of lever R', the spring $r^2$ within the sleeve Q forces the hook R backward clamping the twine or wire Z between said hook and the edge of the notch s in plate S, and the cord-holder T holds it there fast, the moment it is cut, and the pinion Q' is revolved by the gear-wheel O, carrying the sleeve Q and hook R around with it, and twisting the cut ends of the twine or wire, completing the tying of the "hand." The springs $Q^2$ $Q^3$ permit the yoke P to yield and be drawn inwardly to compensate for the shortening of the twine or wire in the operation of twisting, as shown in dotted lines in Fig. 1, and serve to restore said yoke to its normal position immediately afterward. If wire has been employed as the tying medium, this twisting will be found sufficient, but in the event of using twine, there is the possibility of the same becoming untwisted, and to guard against this, I have provided the described push-rod X and its connections. As best shown in Fig. 1, the spiral hook y at the top of the rod Y is made wide or flaring, and so, as soon as the cut ends of the twine Z have been twisted, it is only necessary to push in on the button or handle of the rod X, which will cause the said spiral hook to catch the said twisted ends, and as the rod is revolved by the pinion Y' and rack X' the said ends will be tucked in under the twine band, as clearly indicated in Fig. 8, and be held by the natural expansion of the "hand" Z'. The moment the twine or wire has been cut, the force of the spring $N^3$ will cause the shaft N to return to its normal position, shown in Fig. 2, with the cam n on said shaft in engagement with the lower end of the lever R' and the hook R thereby again pushed forward, and in the continuous operation of the device the small waste portions of the twine or wire will free themselves at the point of the cut, and drop down freely out of the way.

Having thus described my invention, what I claim as new, and desire to secure by Letters Patent, is—

1. In a bundle-tying machine, the combination of a suitable frame and standard, a receiver for the goods to be tied, a compressor for vertical engagement therewith, a vertical rod for operating said compressor, a lever connection between said compressor and rod, a movable needle carrying twine or wire for tying said goods, means for operating the needle, twisting and cutting mechanism, a revoluble shaft connected to the same, a flexible connection leading from said shaft and a double treadle, one part of which is connected to the said vertical rod, and the other part of which is connected to said flexible connection, substantially as set forth.

2. In a bundle-tying machine, the combination of a suitable frame and standard, a receiver for the goods to be tied, a vertically moving compressor having a projecting arm, a movable needle carrying twine or wire for tying said goods, means for operating the needle, cord holding twisting and cutting mechanism, and an operating lever connected to the same projecting beneath the said compressor arm, and adapted to be actuated by the latter as it descends upon the goods to be tied, substantially as set forth.

3. In a bundle-tying machine, the combination of a suitable frame and standard, a receiver for the goods to be tied, a vertically moving compressor, a vertically movable rod for operating the same, a lever connection between the compressor and rod, a series of pins projecting from said rod, a shaft supported beneath said receiver, a movable needle and a mutilated pinion fast on said shaft, a toothed segment supported adjacent thereto and in mesh with said pinion, and a pin projecting from said segment between and transversely to the line of projection of the pins on said rod, substantially as set forth.

4. In a bundle-tying machine, the combination of a suitable frame and standard, a receiver for the goods to be tied, a vertically moving compressor, a movable needle carrying twine or wire for tying said goods, a revoluble shaft beneath the receiver provided with a cam, a gear wheel fast on said shaft, a spring supported yoke loose on said shaft, a revoluble sleeve carried by said yoke, a pinion on said sleeve in mesh with said gear-wheel, a spring-controlled twisting hook longitudinally movable within said sleeve, cord holding and cutting mechanism, and a pivoted lever in engagement at one end with said twisting hook and at its other end with the cam on said shaft, substantially as set forth.

5. In a bundle-tying machine, the combination of a suitable frame and standard, a receiver for the goods to be tied, a vertically moving compressor, a movable needle carrying the tying cord, means for operating the needle, cord holding twisting and cutting mechanism, a vertical revoluble rod adjacent to the receiver, and provided with a pinion and with a spiral hook at one end, said hook extending from the said rod on one side only, and flaring vertically and tapering spirally from its end adjacent to said rod toward its free end, and a spring-controlled push-rod provided with a toothed rack for engagement with said pinion, substantially as set forth.

In testimony that I claim the foregoing I have hereunto set my hand, at Milwaukee, in the county of Milwaukee and State of Wisconsin, in the presence of two witnesses.

RICHARD TELL.

Witnesses:
H. G. UNDERWOOD,
C. W. SCOTT.